(12) United States Patent
Schönenberg et al.

(10) Patent No.: US 6,402,244 B1
(45) Date of Patent: Jun. 11, 2002

(54) AIRCRAFT PASSENGER SEAT

(75) Inventors: Frank-Heinrich Schönenberg, Schwäbisch Hall; Thomas König, Weiden, both of (DE)

(73) Assignee: Aida Development GmbH, Schwaebisch Hall (DE)

(*) Notice: Subject to any disclaimer, the term of this patent is extended or adjusted under 35 U.S.C. 154(b) by 0 days.

(21) Appl. No.: 09/549,092

(22) Filed: Apr. 13, 2000

(30) Foreign Application Priority Data

Apr. 13, 1999 (DE) ........................................ 199 116 593

(51) Int. Cl.[7] ............................................. A47C 1/022
(52) U.S. Cl. .............. 297/284.11; 297/327; 297/452.21
(58) Field of Search ..................... 297/284.11, 302.2, 297/313, 326, 327, 452.21

(56) References Cited

U.S. PATENT DOCUMENTS

| 4,775,185 A | * 10/1988 | Scholin et al. ......... 297/284.11 |
| 4,790,598 A | * 12/1988 | Locher .................... 297/302.2 |
| 5,716,099 A | * 2/1998 | McDiarmid ............ 297/284.11 |
| 5,988,748 A | * 11/1999 | Morrison et al. ...... 297/284.11 |

FOREIGN PATENT DOCUMENTS

| DE | 2 363 392 | 7/1974 | |
| DE | 29 10 160 A1 | 9/1980 | |
| DE | 36 38 231 A1 | 5/1988 | |
| DE | 38 12 337 A1 | 3/1989 | |
| EP | 30806 | * 6/1981 | ............. 297/302.2 |
| FR | 2.080.947 | 11/1971 | |
| WO | WO 98/36967 | 8/1998 | |

* cited by examiner

*Primary Examiner*—Peter R. Brown
(74) *Attorney, Agent, or Firm*—Laurence A. Greenburg; Werner H. Stemer; Ralph E. Locher (57) ABSTRACT

An aircraft passenger seat is formed of a mounting frame having a tilt axis about which a seat part containing a seating surface and a backrest is tiltable. To ensure simple measures for adjusting the seat part with little movement in a region of the front edge, the tilt axis is disposed in a middle portion of the seating surface and a device is provided in a front portion of the seating surface which reduces the thigh pressure in the front portion of the seating surface on reclining the seat part. This may be achieved for example by a forwards downswept outer contour of the seating surface in the front portion.

13 Claims, 5 Drawing Sheets

AIRCRAFT PASSENGER SEAT

BACKGROUND OF THE INVENTION

FIELD OF THE INVENTION

The invention relates to an aircraft passenger seat formed of a mounting frame containing a tilt axis about which a seat part having a seating surface and a backrest is tiltable.

One such aircraft passenger seat is known from German Patent DE 42 22 222 C2. In this known aircraft passenger seat a seat part is configured as a plastic seat shell. In a region of a front edge, the seat part is mounted on a tilt axis fixedly disposed on a mounting frame. Provided at a rear end of the seating surface is a positioner cooperating with a positioning device of the mounting frame to permit setting the tilt of the seat part relative to the mounting frame. Since the seat part is mounted in the region of its front edge, the front edge of the seating surface retains its height at all tilt settings. Although the seating comfort is not detrimented by increased thigh strain, the disadvantage in this known seat is, however, that the passenger is unable to promote the uprighting of the seat part from its lowest position, thus making a relatively complicated lifting device necessary.

SUMMARY OF THE INVENTION

It is accordingly an object of the invention to provide an aircraft passenger seat that overcomes the above-mentioned disadvantages of the prior art devices of this general type, in which the uprighting of the seat is promoted by the passenger while minimizing the pressure exerted on the thighs of the passenger.

With the foregoing and other objects in view there is provided, in accordance with the invention, an aircraft passenger seat, including:

a seat part having a middle portion, a backrest and a seating surface with a front portion;

a mounting frame having a tilt axis about which the seat part is tiltable, the tilt axis runs through the middle portion of the seating surface; and a device disposed on the front portion of the seating surface for reducing a thigh pressure from the front portion of the seating surface on reclining the seat part.

To achieve the object it is proposed in the aircraft passenger seat of the aforementioned kind to dispose the tilt axis in a middle portion of the seating surface and that a device is provided in the front portion of the seating surface which reduces the thigh pressure in the front portion of the seating surface on reclining the seat part.

Since the tilt axis in the aircraft passenger seat in accordance with the invention is disposed in a middle portion, uprighting the seat part from its lowest position is promoted by the passenger. In this configuration the front portion of the seat acts as a lever which promotes uprighting. Although no stationary conditions exist in the front portion of the seating surface, thigh pressure is minimized by the device provided so that seating comfort is not detrimented. The aircraft passenger seat in accordance with the invention contains in all a simple and thus cost-effective structure.

Advantageously, the tilt axis is disposed in the vicinity of the seating point of the passenger, preferably aft thereof, to assure that the front portion of the seating surface acts as a lever promoting the uprighting of the seat part from its lowest position.

In this arrangement the tilt axis can be disposed in a range of 30 to 70% of the depth of the seating surface.

In one advantageous aspect the seat contains a foamed cushion more particularly of soft PU foam material. Expediently the foamed cushion is removable and thus defined replaceable in the seat part.

To reduce the rise of the front portion of the seating surface when the seat part is tilted backwards, the seat and/or the foamed cushion may contain in the front portion a forwards downswept outer contour so that on tilting the seat part, only a very slight rise occurs in the front portion of the seating surface.

In one advantageous further embodiment the seat and/or the foamed cushion contains an outer contour, starting at the tilt axis which is initially upswept and then downswept forwards.

In accordance with another advantageous aspect the foamed cushion may contain in the front portion of the seating surface a lower Shore hardness than in the rear portion of the seating surface.

In this configuration, for example, a foam material having a lower Shore hardness may be provided in the front portion.

In an alternative aspect the foamed cushion is nicked in the front portion to reduce the Shore hardness, as may be achieved, for example, by a plurality of nicks oriented crosswise.

In another advantageous aspect the seating surface contains a front part hinged to the rear part of the seating surface and advanced on a slide guide.

In yet another advantageous aspect an upholster element is provided in the front portion of the seating surface. The volume of the upholster element is variable so that the passenger automatically varies the volume.

Advantageously the seat part has a positioner for changing the seating position.

In this configuration the positioner has at least one lifting device hinged at one end to the mounting frame and at the other to the seat part, more particularly in the region of the main pressure point of the passenger.

The lifting device contains at least two interhinged hinge members connected at one end to the seat part and at the other to the mounting frame, and an actuator engages a connecting point of the hinge members. In a normal position of the seat part the two hinge members are located at an angle to each other, as a result of which the resulting loads are transmitted substantially lossless to the mounting frame while the actuator is practically zero-loaded. In addition, the actuator is loaded in the correct direction when stressed.

In this configuration a pneumatic, hydraulic or electrical actuator may be put to use.

In accordance with another advantageous embodiment the actuator is hinged at one end to a front mounting bracket of the mounting frame and at the other to the connecting point of the hinge members.

In still another advantageous aspect a fold-down table is provided in the region of the backrest. The table held by two supporting arms spaced away from each other is swivel-mounted on the tilt axis of the seat part so that in the fold-down position the table is not included in the adjusting movement of the seat part, there also being no relative movement between the seat part and the table in the folded-up position.

Preferably at least one of the supporting arms of the table has a supporting element which is supported in the fold-down position of the table on the mounting frame.

In this configuration the supporting element may contain a peg engaging an assigned recess in the mounting frame.

Advantageously the seat part is configured as a one-part plastics seat shell.

Other features which are considered as characteristic for the invention are set forth in the appended claims.

Although the invention is illustrated and described herein as embodied in an aircraft passenger seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a schematic side view of an aircraft passenger seat 10 generally used in commuter aircraft. The aircraft passenger seat 10 includes a mounting frame 14 secured to a cabin floor and made of aluminum. The mounting frame 14 contains supporting frames 18a, 18b spaced away from each other, each of which is made of aluminum. The spaced supporting frames 18a, 18b are connected to each other via a front crosstube 15 and a rear crosstube 16. Protruding horizontally from an inner side of each of the supporting frames 18a, 18b is a pin 39 (see FIG. 10) forming a tilt axis 17 for a seat part 11.

Figure 1:
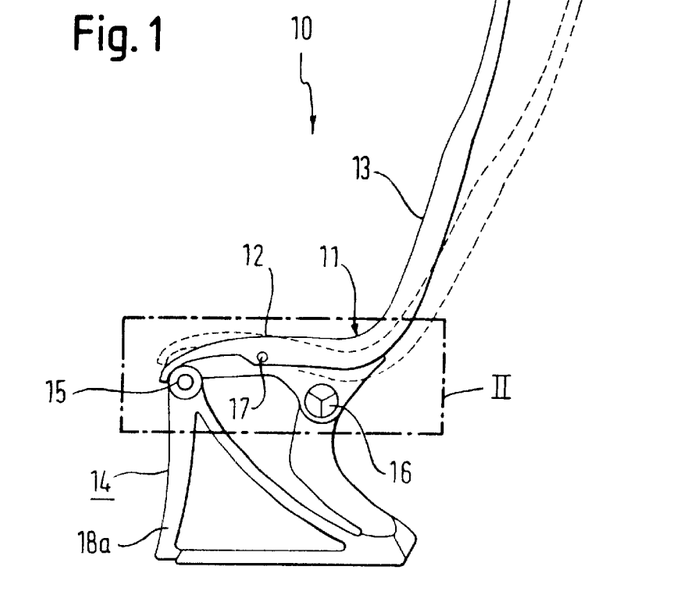
FIG. 1 is a diagrammatic, side-elevational view of an aircraft passenger seat in accordance with the invention.

The seat part 11 of the aircraft passenger seat 10 is engineered as a one-part plastic seat shell. The seat part 11 contains a seating surface 12 and a backrest 13 joined thereto. In the embodiment as shown the backrest 13 is fixedly connected to the seating surface 12, it may, however, also be provided reclinable relative to the seating surface 12.

The seat part 11 is disposed tilt-adjustable relative to the mounting frame 14. Mounting the seat part 11 on the mounting frame 14 is done via the tilt axis 17 disposed in a middle portion of the seating surface 12.

Figure 2:
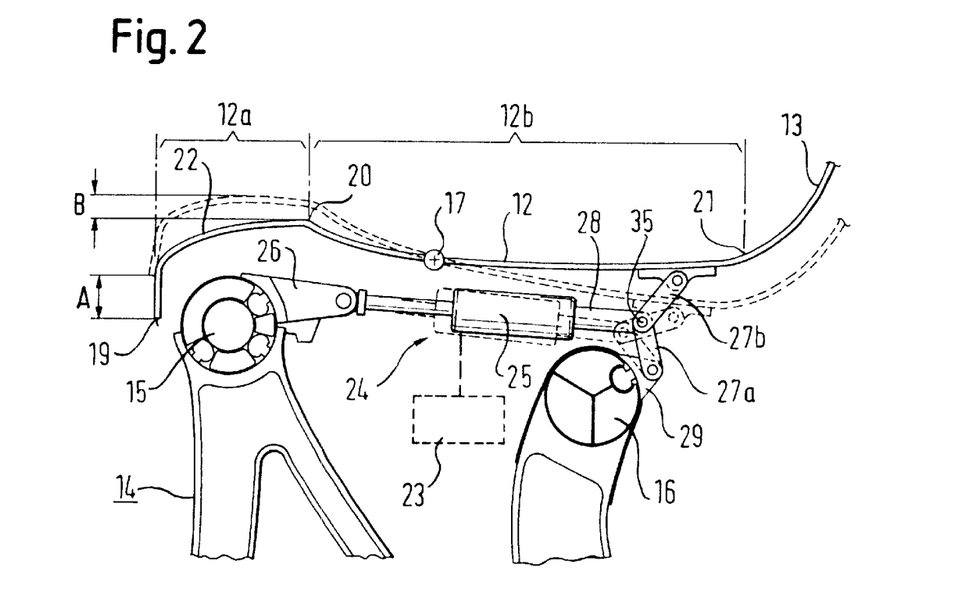
FIG. 2 is an enlarged, fragmented, side-elevational view of detail II shown in FIG. 1.

Referring now to FIG. 2 there is illustrated on a magnified scale the detail II shown in FIG. 1. It being obvious from the illustration that the tilt axis 17 is disposed in the middle portion of the seating surface 12, i.e. to take advantage of the seating point of the passenger so that his/her weight promotes the uprighting of the seat part 11 from its tilted position. The tilt axis 17 is disposed roughly in a range of 30 to 70% of a depth of the seating surface 12.

The seating surface 12 can be divided into a front portion 12a and a rear portion 12b. The front portion 12a extending from a front edge 19 of the seating surface 12 to a zenith portion 20, the rear portion 12b extending from the zenith portion 20 to a backrest root 21.

In the front portion 12a the seating surface 12 contains a forwards downswept outer contour 22. The outer contour 22 is initially upswept starting from the tilt axis 17 to the zenith portion 20 before then being downswept in the direction of the front edge 19.

When the seat part 11 is tilted into the lower (reclined) position as shown in FIG. 2 by the broken line, the outer contour 22 downswept in the front portion 12a results in only a slight rise in the seating surface 12 in the front portion 12a, this being particularly evident from FIG. 2. When the seating surface 12 is tilted into the lower position as indicated by the broken line the front edge 19 is raised by a distance A, as compared to which the rise in the zenith portion 20 is only by a substantially smaller distance B.

Accordingly, the forward downswept outer contour in the front portion 12a results in only a slight rise in the seating surface 12, as a result of which the pressure exerted on the thighs of the passenger is not increased substantially, there thus being no discomfort in seating when reclining the seat part 11.

Also evident from FIG. 2 is a positioner 23 for the seat part 11 containing a lifting device 24. The lifting device 24 contains an actuator 25 which in the embodiment as shown in FIG. 2 is engineered as a single-acting peumatic actuator 25, although as an alternative a hydraulic or electrical actuator 25 may be provided just as well.

The actuator 25 is secured at one end to a mounting bracket 26 that is in turn secured to the front crosstube 15. At the other end a piston rod 28 of the actuator 25 is hinged to a point 35 connecting two hinge members 27a, 27b. The hinge member 27a is hinged to a mounting bracket 29 defined by the rear crosstube 16. The hinge member 27b is hinged in the region of a main pressure point to an underside of the seat part 11.

In the starting position illustrated in FIG. 2 by the bold lines the hinge members 27a, 27b are disposed at an angle to each other so that when the seat part 11 is tilted the actuator 25 is extended in the correct direction. In addition, the loads occurring are transmitted substantially lossless into the mounting frame 14.

Referring now to FIGS. 3 to 7 there are illustrated differing variants for reducing the thigh pressure in the front portion 12a of the seating surface 12 when the seat part is reclined.

Figure 3:
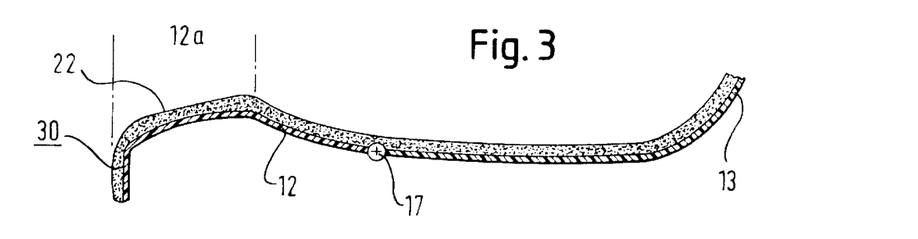
FIG. 3 is a sectional view through a seating surface of the aircraft passenger seat shown in FIG. 1.

Referring now to FIG. 3 there is illustrated an embodiment in which the outer contour 22 of the seating surface 12 in the front portion 12a is downswept forwards. In this configuration a foam cushion 30 of soft PU foam is applied to the seating surface 12 and has a substantially constant thickness.

Figure 4:
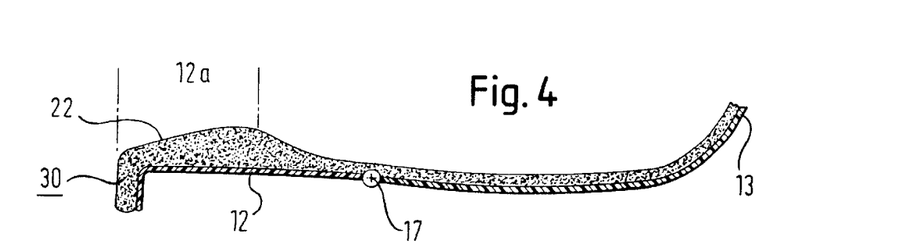
FIG. 4 is a sectional view through the seating surface of another embodiment of the aircraft passenger seat.

Referring now to FIG. 4 there is illustrated an aspect in which the forwards downswept outer contour 22 is achieved by the cross-section of the foam cushion 30, as compared to which the seating surface 12 has a substantially linear profile.

Preventing the undesirable increase in thigh pressure in the front portion 12a of the seating surface 12 when the seat part 11 is tilted backwards may also be achieved by making use of a foam material having a lower Shore hardness in the front portion 12a of the foam cushion 30.

Figure 5:
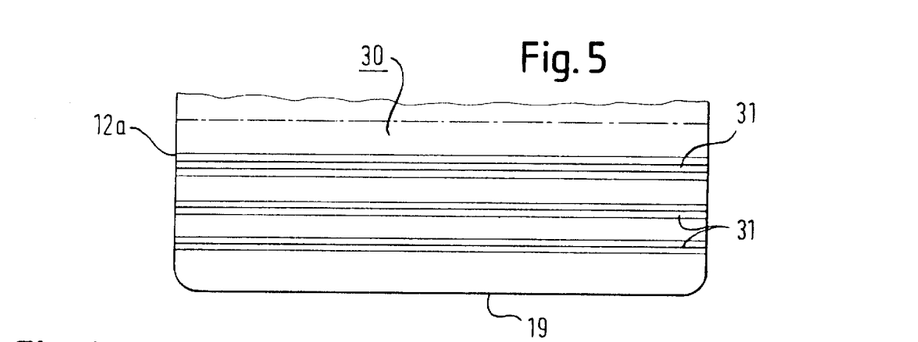
FIG. 5 is a fragmented, plan view of a front portion of a seat cushion for a further embodiment that includes nicks to reduce a Shore hardness.

Referring now to FIG. 5 there is illustrated an embodiment in which the pliancy of the foam cushion 30 is enhanced in the front portion 12a by crosswise nicks 31, this too enabling an increase in pressure near to the knees to be prevented when reclining the seat part 11.

Figures 6, 7:
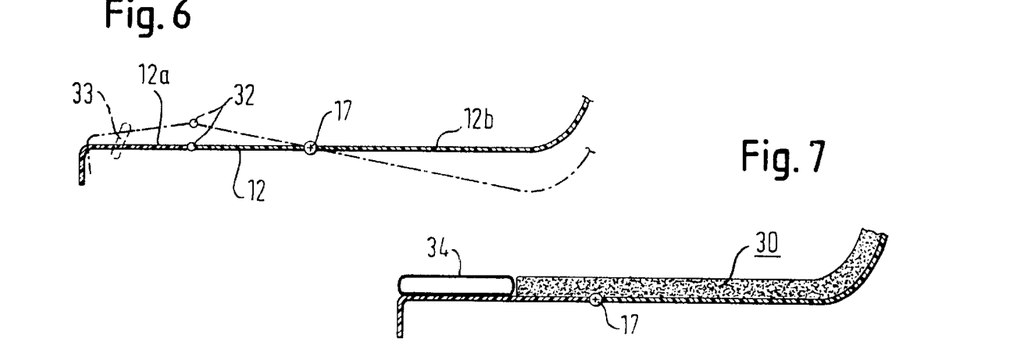
FIG. 6 is a sectional view through the seating surface of yet a further embodiment that includes a hinged front portion of the seating surface.
FIG. 7 is a sectional view through the seating surface of a another further embodiment that includes a variable-volume upholster element.

Referring now to FIG. 6 there is illustrated a further example embodiment in which the front portion 12a of the seating surface 12 is connected to the main part thereof via a hinge joint 32. The tilting action of the front portion 12a is guided via a slide guide 33 so that when the seat part 11 is reclined into the lower position as indicated by the broken line a defined reclining of the front portion 12a is attained.

Referring now to FIG. 7 there is illustrated yet another variant in a schematic side view in which an upholster element 34 is provided in the front portion 12a. A volume of the upholster element 34 is variable and can be set by the passenger.

Figure 8:
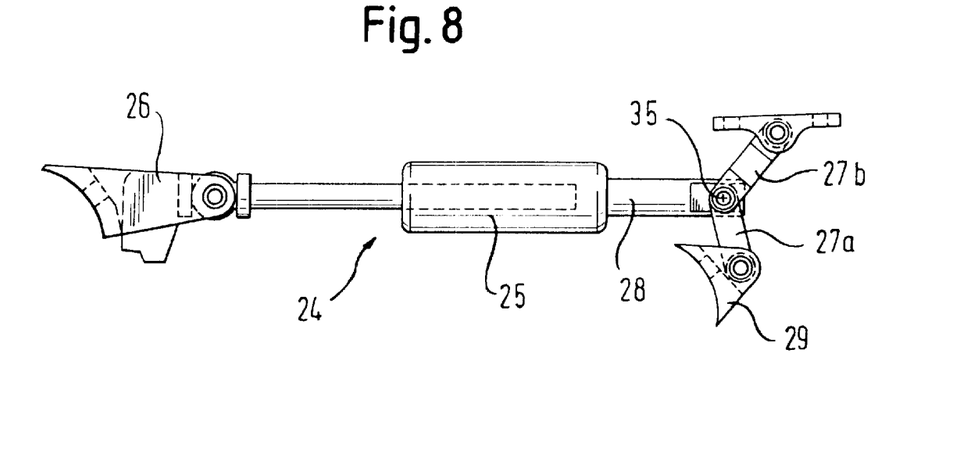
FIG. 8 is a detail illustration of a lifting device of the aircraft passenger seat as shown in FIG. 1.

Referring now to FIG. 8 there is illustrated in detail the lifting device 24 as shown in FIG. 2. The lifting device 24 contains the pneumatic actuator 25, the piston rod 28 which is hinged at the connecting point 35 of the hinge members 27a, 27b. FIG. 8 shows the lifting device 24 in the normal position of the seat part 11 wherein the hinge members 27a, 27b are disposed at an angle to each other.

Figure 9:
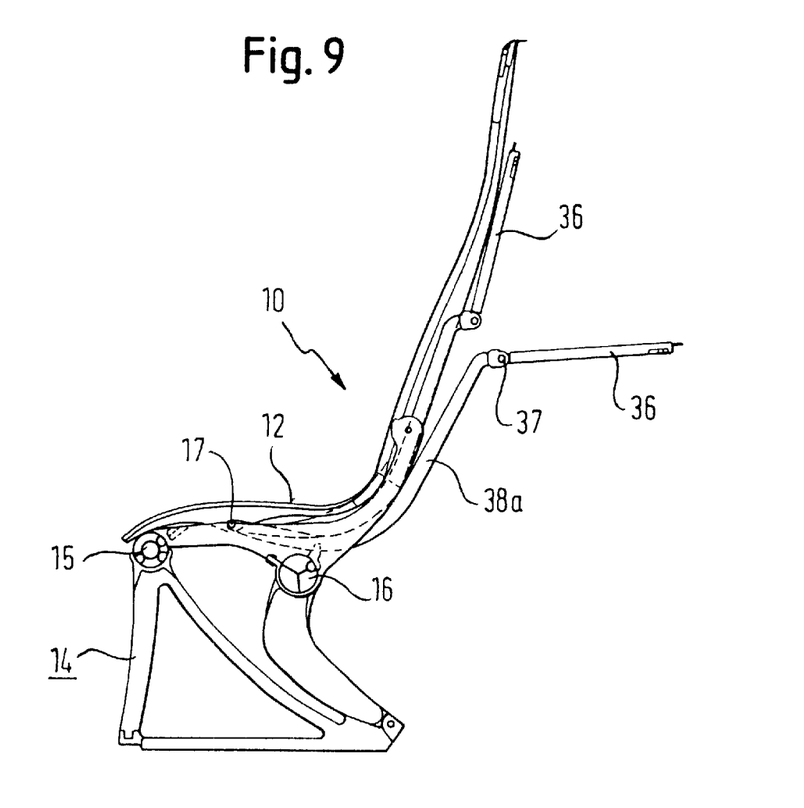
FIG. 9 is a side-elevational view of the aircraft passenger seat that includes a fold-down table.

Referring now to FIG. 9 there is illustrated the aircraft passenger seat 10 as shown in FIG. 1 but with a table 36 fitted to the passenger seat 10. The table 36 disposed folded-down in a region of the backrest is mounted at one end on two supporting arms 38a, 38b spaced away from each other, at a free end of which a hinge joint 37 is provided.

Figure 10:
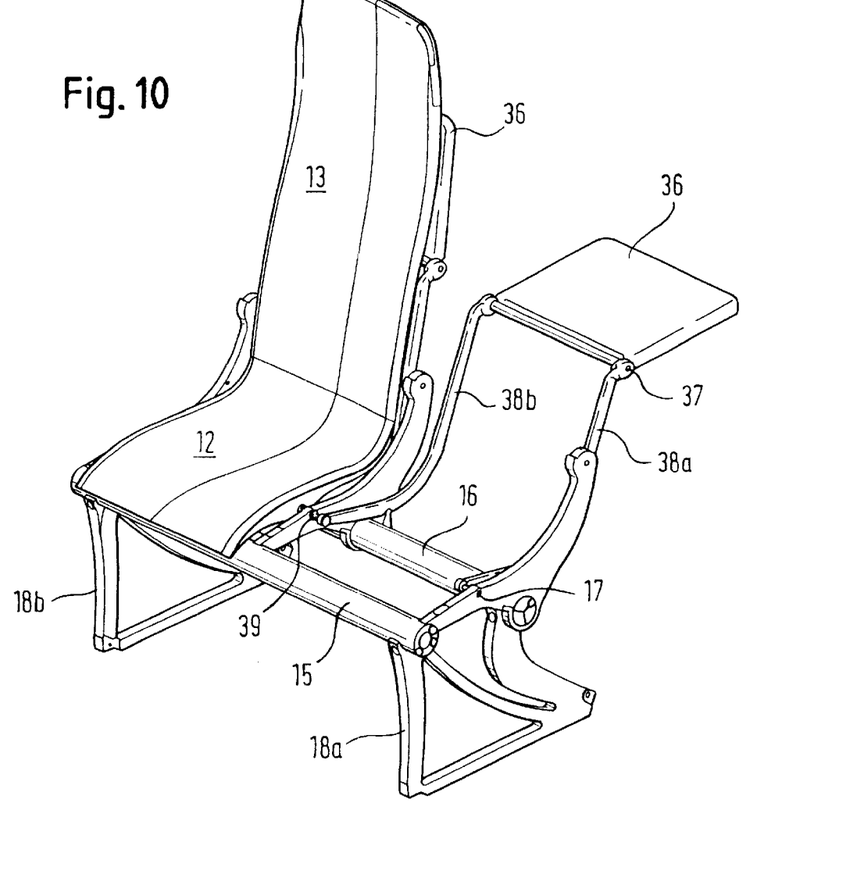
FIG. 10 is a perspective view of a row of two aircraft passenger seats, from one of which the seat part is missing.

Referring now to FIG. 10 it is particularly evident how each of the supporting arms 38a, 38b is hinged on the supporting pins 39 which likewise form the tilt axis 17 for the seat part 11, as a result of which the table 36 in the folded down position is not involved in the tilt action of the seat part 11.

In the folded-up position the supporting arms 38a, 38b as well as the table 36 are a snug fit on the backrest 13 of the seat part 11, there being no relative movement between the seat part and the table 36 in this position.

Figure 11:
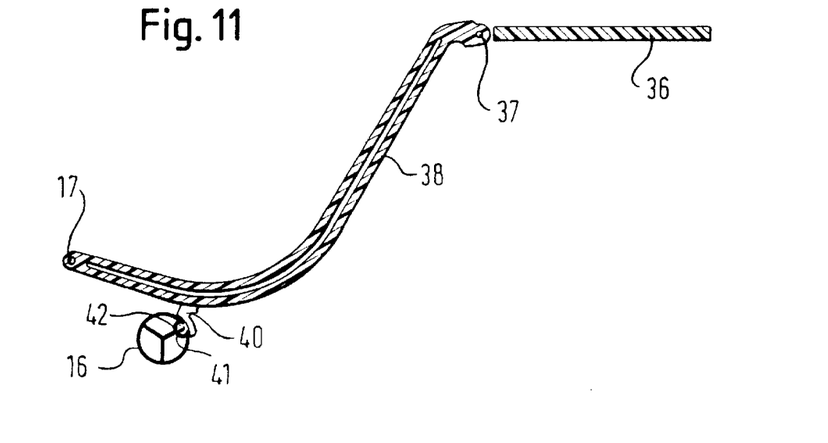
FIG. 11 is a sectional view through a supporting arm and a table surface of the fold-down table.

Referring now to FIG. 11 there is illustrated a vertical section through the fold-down table 36 and the supporting arms 38a, 38b. To achieve a secure support of the table 36 in the folded-down position a supporting element 40 is provided on each of the supporting arms 38a, 38b. In this configuration the seating element contains a peg 41 engaging an assigned recess 42 in the rear crosstube 16 in the fold-down position of the table 36.

Figure 12:
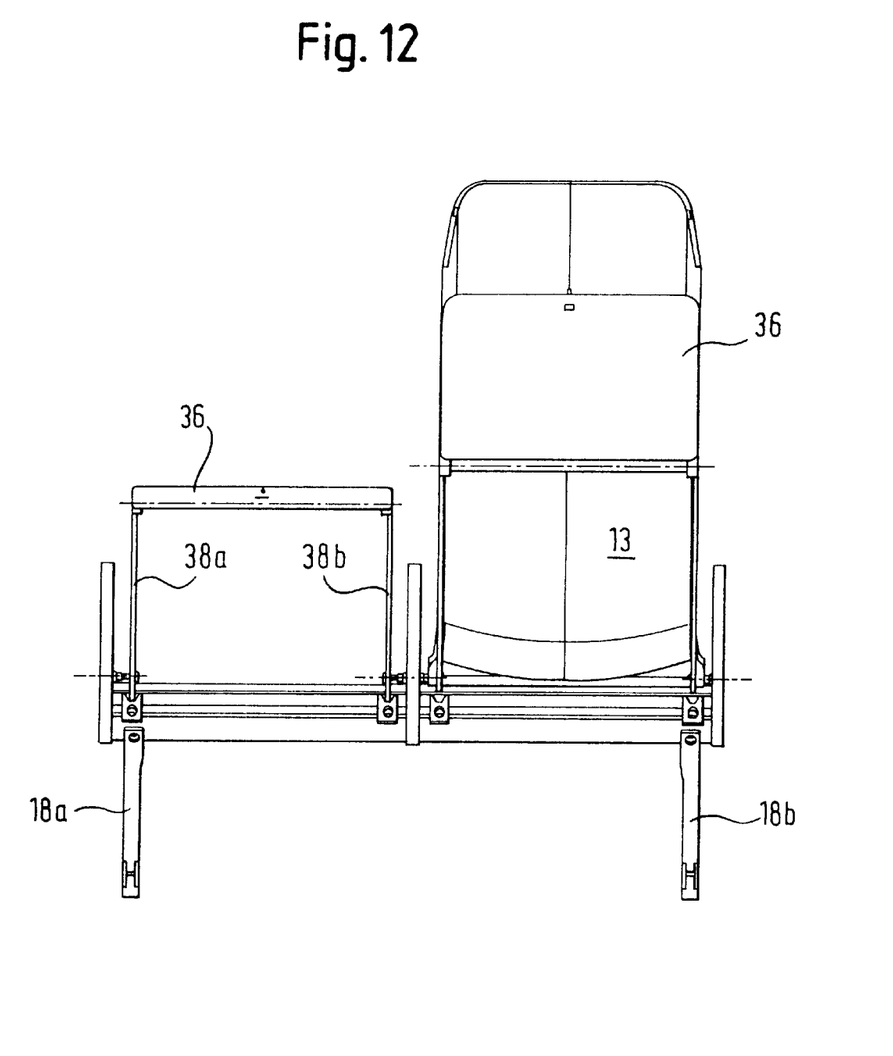
FIG. 12 is a rear view of the seat row as shown in FIG. 10.

Referring now to FIG. 12 there is illustrated a rear view of a seat row as shown in FIG. 10. From this illustration too, it is evident that the fold-down table 36 is disposed on the supporting arms 38a, 38b tilt mounted on the tilt axis 17 of the seat part 11.

The variants in the embodiment of the aircraft passenger seat 10 as described above are characterized by a simple structure incorporating few parts, resulting in cost-effective production. Common to all embodiments is that due to the special configuration of the front portion 12a of the seating surface 12 in the low position only a low thigh pressure materializes, as a result of which added seating comfort is assured in all seating positions.

We claim:

1. An aircraft passenger seat, comprising:

a one-part plastic shell seat part having a seating surface and a backrest;

said seating surface having a front portion, a middle portion, and a rear portion, said middle portion defining a seating location for a passenger;

a mounting frame having a positioner for changing a seating position, and a tilt axis about which said seat part is to be tilted in a reclined position, said tilt axis running through said middle portion of said seating surface causing the weight of a passenger to promote an uprighting of said seat part from said reclined position;

said positioner having at least one lifting device hinged at one end to said mounting frame and at another end to said seat part in a region of said rear portion defining a main pressure point for a passenger in said reclined position; and said seating surface having an outer contour in said front portion, said outer contour extending initially upwardly starting from said tilt axis in direction of a front edge of said front portion and then extending downwardly.

2. The aircraft passenger seat according to claim 1, wherein said seating surface has a depth, and said tilt axis disposed roughly in a range of 30% to 70% of said depth of said seating surface.

3. The aircraft passenger seat according to claim 1, wherein said seat part has a foamed cushion formed of a soft PU foam material.

4. The aircraft passenger seat according to claim 3, wherein the cross-section of said foamed cushion contains in said front portion an outer contour extending forwardly and downwardly.

5. The aircraft passenger seat according to claim 4, wherein said foamed cushion disposed in said front portion of said seating surface has a lower Shore hardness than in said rear portion said seating surface.

6. The aircraft passenger seat according to claim 5, wherein said foamed cushion is nicked in said front portion to reduce the Shore hardness.

7. The aircraft passenger seat according to claim 1, wherein an upholster element is disposed on said front portion of said seating surface.

8. The aircraft passenger seat according to claim 1, wherein said lifting device contains at least two interhinged hinge members connected at one end to said seat part and at the other to said mounting frame, and an actuator engaging a connecting point of said at least two interhinged hinge members.

9. The aircraft passenger seat according to claim 8, wherein said actuator is selected from the group consisting of pneumatic actuators, hydraulic actuators and electrical actuators.

10. The aircraft passenger seat according to claim 9, wherein said mounting frame has a fronting mounting bracket and said actuator is hinged at one end to said front mounting bracket and at another end to said connecting point of said hinge members.

11. The aircraft passenger seat according to claim 1, including two supporting arms and a fold-down table disposed in a region of said backrest, said fold-down table held by said two supporting arms spaced away from each other, and swivel-mounted about said tilt axis.

12. The aircraft passenger seat according to claim 11, wherein at least one of said two supporting arms for said fold-down table has a supporting element supported in a fold-down position of said fold-down table on said mounting frame.

13. The aircraft passenger seat according to claim 12, wherein said mounting frame has a recess formed therein and said supporting element has a peg engaging said recess in said mounting frame.

* * * * *

UNITED STATES PATENT AND TRADEMARK OFFICE
CERTIFICATE OF CORRECTION

PATENT NO.    : 6,402,244 B1
DATED         : June 11, 2002
INVENTOR(S)   : Frank-Heinrich Schönenberg et al.

It is certified that error appears in the above-identified patent and that said Letters Patent is hereby corrected as shown below:

<u>Title page,</u>
Item [30], should read as follows:
--     Foreign Application Priority Data
Apr. 13, 1999   (DE) ..................... 199 16 593.9 --

Signed and Sealed this

Twenty-ninth Day of October, 2002

Attest:

Attesting Officer

JAMES E. ROGAN
*Director of the United States Patent and Trademark Office*